(12) United States Patent
Tamai et al.

(10) Patent No.: US 7,692,811 B2
(45) Date of Patent: Apr. 6, 2010

(54) IMAGE FORMING APPARATUS AND METHOD

(75) Inventors: Yoshiyuki Tamai, Tokyo (JP); Yoichi Kawabuchi, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1172 days.

(21) Appl. No.: 11/162,718

(22) Filed: Sep. 20, 2005

(65) Prior Publication Data
US 2007/0008586 A1 Jan. 11, 2007

(30) Foreign Application Priority Data
Jul. 7, 2005 (JP) ............................ P2005-198978

(51) Int. Cl.
G06F 15/00 (2006.01)
G05B 19/42 (2006.01)
(52) U.S. Cl. ....................................... 358/1.18; 700/86
(58) Field of Classification Search ................ 358/1.18, 358/1.15, 1.14, 1.13, 500, 540, 3.27, 453, 358/1.9; 399/9, 31, 299, 302, 313, 389; 700/86, 700/18, 83, 87, 17, 19; 382/270, 141, 209, 382/286, 195, 273, 155; 235/454, 494; 714/752
See application file for complete search history.

(56) References Cited

U.S. PATENT DOCUMENTS

| | | | |
|---|---|---|---|
| 5,149,140 | A | 9/1992 | Mowry, Jr. et al. |
| 5,717,597 | A | 2/1998 | Kara |
| 6,256,110 | B1 | 7/2001 | Yoshitani |
| 6,414,757 | B1 | 7/2002 | Salem |
| 6,603,864 | B1 | 8/2003 | Matsunoshita |
| 6,807,388 | B1 * | 10/2004 | Kojima et al. .................. 399/80 |
| 7,006,660 | B2 | 2/2006 | Hayashi |
| 2001/0041005 | A1 * | 11/2001 | Fujiwara ...................... 382/181 |
| 2003/0191941 | A1 | 10/2003 | Terada et al. |

(Continued)

FOREIGN PATENT DOCUMENTS

JP 11-232259 8/1999

(Continued)

OTHER PUBLICATIONS

Japanese Office Action, Notification of Reasons for Refusal, dated Oct. 30, 2007, for JP Application No. 2005-198978, and English Translation thereof.

(Continued)

*Primary Examiner*—Saeid Ebrahimi Dehkordy
(74) *Attorney, Agent, or Firm*—Buchanan Ingersoll & Rooney PC

(57) ABSTRACT

A printed material is read to provide an image data thereof. The printed material includes an image of an original, and an additional image not recognized or hard to be recognized with naked eyes. The additional image is to be visualized when an image is formed based on the image data with an image forming apparatus. Further, the printed material includes and a code which represents information. When the code is detected in the image data, a stamp image is synthesized with the image data based on the detected code. Then, the image data synthesized with the stamp image is provided. For example, an image is printed based on the image data.

20 Claims, 14 Drawing Sheets

U.S. PATENT DOCUMENTS

2004/0150859 A1     8/2004    Hayashi

FOREIGN PATENT DOCUMENTS

| JP | 2000-138813 A | 5/2000 |
|----|---------------|--------|
| JP | 2000-182086 A | 6/2000 |
| JP | 2001-094754 A | 4/2001 |
| JP | 2001-215852 A | 8/2001 |
| JP | 2001-346032 A | 12/2001 |
| JP | 2003-169204   | 6/2003 |
| JP | 2003-189088 A | 7/2003 |
| JP | 2003-298834 A | 10/2003 |
| JP | 2004-072343 A | 3/2004 |
| JP | 2004-104221   | 4/2004 |
| JP | 1 014 318 B1  | 5/2004 |
| JP | 2004-223854   | 8/2004 |
| JP | 2005-012623 A | 1/2005 |
| JP | 2005-094239 A | 4/2005 |

OTHER PUBLICATIONS

Notification of Reasons for Refusal in JP 2005-198978 dated Feb. 12, 2008, and Translation thereof.

Official Action (Notification of Reasons of Refusal) issued by the Japanese Patent Office in priority JP Patent Appln. No. 2005-198978, Jul. 17, 2007; and English translation thereof.

\* cited by examiner

IMAGE FORMING APPARATUS AND METHOD

This application is based on application No. 2005-198978 filed in Japan, the contents of which are hereby incorporated by reference.

BACKGROUND OF THE INVENTION

1. Field of the Invention

The present invention relates to prevention of illegal copies in image forming and the like.

2. Description of Prior Art

Recently electrophotographic copying machines become popular, and anyone can use them easily to reproduce characters and images printed on a sheet of paper or the like. Especially, image data processing and image forming technologies in a digital copying machine, a multifunctional peripheral or the like are improved very much, and even a copy very difficult to be distinguished from its original can be produced easily.

Therefore, an original such as an important document or a secret document whose reproduction should be inhibited can be reproduced to provide copies substantially the same as the original illegally and the copies can be leaked outside. Further, scanning apparatuses also become popular, and an original such as an important document or a secret document inhibited to be reproduced can be scanned and transmitted via a network as an electronic file. Therefore, it is an important problem to prevent forgery, falsification, illegal copying, and illegal reproduction of important documents and the like.

As a countermeasure for preventing illegal copying, it is proposed to embed a latent image not recognized or difficult to be recognized with naked eye in an image of an original and to visualize the latent image when the original is copied (for example, Japanese Patent laid open Publication 2004-223854). This has an effect to prevent illegal copying psychologically because a copy not equivalent to an original is produced when the original includes such a latent image. In this technology, the latent image embedded in an image of the original is an additional image not recognized or difficult to be recognized with naked eye, and it is prepared to become visualized apparently when the original is reproduced with an image forming apparatus. For example, if characters of a character of "COPY INHIBIT" are embedded in an image of an original, when a printed material of the original including the additional image is copied, the additional image embedded in the image, that is, the hidden characters of "COPY INHIBIT" are visualized. Therefore, a copy equivalent to the printed material is not produced, and when one observes the copy, the characters of "COPY INHIBIT" not included in the original are noticed. Therefore, the copy is recognized easily that it is not an original. Thus, illegal copying is prevented psychologically.

However, when an original embedding the above-mentioned latent image for preventing illegal copying psychologically is printed with an image forming apparatus to provide a copy, the additional image may not be formed as intended on a sheet of paper. For example, when a printed material including a latent or additional image is enlarged or reduced, the visualized additional image is also enlarged or reduced. When the additional image is subjected to enlargement copy, it may become defective, or only a part of the additional image may be reproduced. When the additional image is subjected to reduction copy, it may not be visualized apparently. In such a case, the effect to suppress illegal copying psychologically is damaged. Further, it may be difficult to distinguish the copy from the original.

As will be explained later, a code is embedded in a background in this embodiment, and this can be considered as a kind of electronic watermark. In an apparatus disclosed in Japanese Patent laid open Publication 2003-169204, the embedded electronic watermark is detected when the image is scaled or rotated. It cannot be distinguished in this technology whether the image is a copy or not.

SUMMARY OF THE INVENTION

An object of the invention is to reproduce an additional image as intended when an image embedding the additional image is copied.

In an aspect of the present invention, a printed material is read to provide an image data thereof. The printed material includes an image of an original and an additional image not recognized or hard to be recognized with naked eyes. The additional image is visualized when an image is formed based on the image data with an image forming apparatus. Further, the printed material includes and a code which represents information. The code is detected in the image data, and a stamp image is synthesized with the image data based on the detected code. Then, the image data synthesized with the stamp image is provided. For example, an image is printed based on the image data.

An advantage of the present invention is that when a printed material of an original is copied, the copy can be discriminated surely from the original by enforcing the stamp processing based on the code detected in the image of the printed material.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
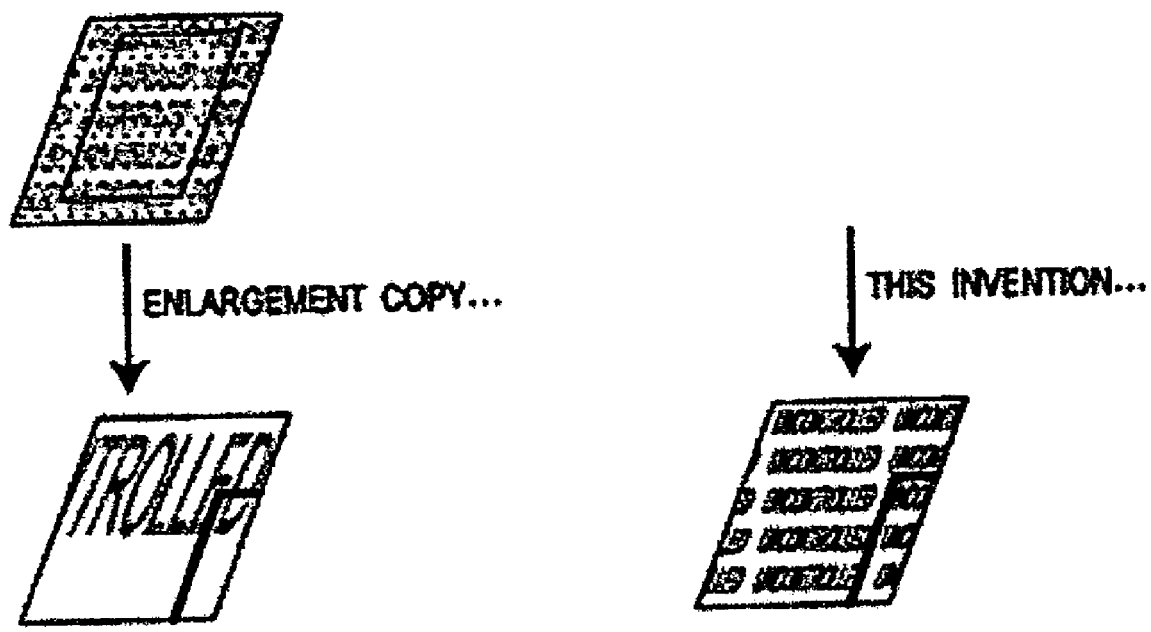
FIG. 1 is a diagram for explaining a concept of hidden characters according to the invention.

Referring now to the drawings, wherein like reference characters designate like or corresponding parts throughout the several views, embodiments of the invention are explained.

In an image forming apparatus according to the invention, a background is added to an image of an original, and an additional image not recognized or difficult to be recognized with naked eye (or a hidden image) is embedded in the background. Here, the background and the additional image are denoted as ground pattern. An additional image is formed in a printed material so as to be visualized when a document including the additional image is reproduced in an image forming apparatus. In an example, the resolution of dots forming the background is set smaller than that of reading in the scanner in the image forming apparatus, while the resolution of dots forming the additional image is set larger than that of reading in the scanner. Because the total image density of the background is set equal to that of the additional image, the additional image is not recognized or difficult to be recognized with naked eye in the printed material. For example, one or more character strings of, for example, "COPY INHIBIT" are embedded as the additional image in an image of an original. When the original including the additional image is copied, the additional image embedded in the image is visualized. Therefore, when one observes the copy, it is obviously noted that the copy is not the original. However, it is to be noted that the additional image is not limited to a character string.

However, the size of the visualized characters is changed, for example, in enlargement copy or reduction copy (including N-in-1 copy mode) of such a document with the ground pattern, and the meaning of the characters may be understood. If the meaning cannot be understood, the effect of the visualization of the additional image becomes low. FIG. 1 shows an example. In an image of an original printed material, character strings of "UNCONTROLLED" are embedded. They are arranged with a specified distance on a sheet of paper. In enlargement copy, when the character strings become defective, the meaning of the characters in the visualized string becomes unclear.

In this embodiment, a code is embedded in an image including a ground pattern. The code is related to information on the additional image. The code includes data on a character string used as an additional image (or stamp information). In the case of the above-mentioned hidden characters, the embedded code represents the character string, and size, arrangement and color thereof. The code may be embedded in a desired position or positions, and preferably in the ground pattern or in the hidden characters so as not to be recognized or hard to be recognized with naked eyes. When the size of the image data is changed (for example, in reduction copy mode, N-in-1 copy mode or enlargement copy mode), if it is decided that the meaning of the additional image becomes unclear, a stamp image is forced to overwrite the original image data, and the image overwritten by the stamp image is printed. Preferably, the background and the additional image are deleted, and the stamp image is added. The stamp image is synthesized with the original image so as to be included in a sheet of paper. The stamp image is created based on the code on stamp information detected in the image. Then even when the size of the image is changed, the additional image of the original size is printed with the original size. In the example shown in FIG. 1, when the information embedded as the code is read, and when the hidden characters become defective, the background and the latent image (hidden characters) are deleted from the image, and the characters having the same size as those added to the original printed material are created as a stamp image and added to the image. Alternatively, a code is not necessarily be related to the additional image. When a code is detected in the image, a predetermined image is used as an additional image, and it is embedded in the image.

When the additional image includes hidden characters, an example of the stamp information includes character string data of the hidden characters, font size, repeat distance and color of the characters. A stamp image can be created by using the information. In another example, the stamp information includes line numbers of the background and the hidden characters, the screen angle, and shape of dither pattern. Table 1 shows an example of the embedded information.

Table 1 Table of Embedded Information

Figure 2:
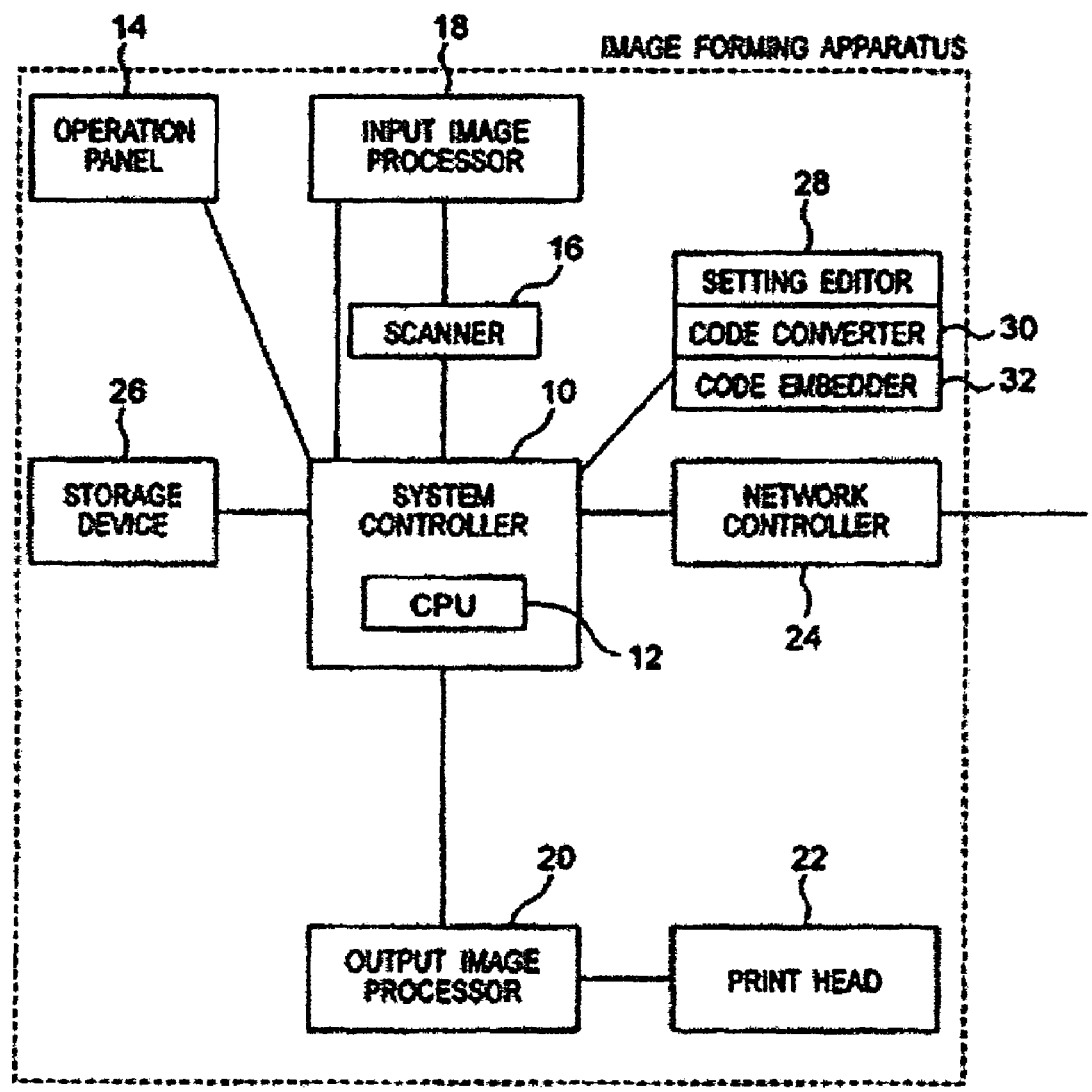
FIG. 2 is a block diagram of a multi-functional peripheral.

FIG. 2 shows a structure of a multi-functional peripheral (MFP) as an example of an image forming apparatus. A system controller 10 has a central processing unit (CPU) 12 for controlling the components in the MFP. An operation panel 14 has an input device for inputting an instruction by an operator and a display device for displaying data or the like. A scanner 16 reads an image of a document. The read image is subjected to various corrections or the like in an input image processor 18. When the image data is printed, it is converted to print data by an output image processor 20 and printed on a sheet of paper with a print head 22. Alternatively, the image data is sent by a network controller 24 via a network to an external apparatus. Further, an image data received by the network controller 24 via the network from an external apparatus is converted to print data by the output image processor 20 and printed on a sheet of paper with a print head 22. Alternatively, when it is instructed to store the image data, it is stored in a storage device 26 or the like. Further, a setting editor 28, a code converter 30 and a code embedder 32 are provided. The components 28, 30 and 32 represent processings executed by the system controller 10. The setting editor 28 sets and edits the information on an additional image such as character string data of hidden characters, font size, repeat distance and color of the characters. The code converter 30 converts information on the additional image to a code. The code embedder 32 embeds the additional image and the code in an image of an original.

| Character string data | COPY INHIBIT |
|---|---|
| Font size | 48 point |
| Repeat Distance | 2,500 dots |
| Color of characters | Red |
| Line number | 75 lpi |
| Screen angle | 45 degrees |
| Shape of dither pattern | circle |

The multifunctional peripheral has functions of enlargement copy, reduction copy, N-in-1 copy, binding, and addition of front cover. In the enlargement copy or reduction function, the document image is enlarged or reduced. In N-in-1 copy function, N sheets of documents are reduced to and printed on a sheet of paper. In the binding function, the document image is shifted by a margin for binding and printed on a sheet of paper. In the front cover addition function, a front cover is added to the front side of the document image.

Figure 3:
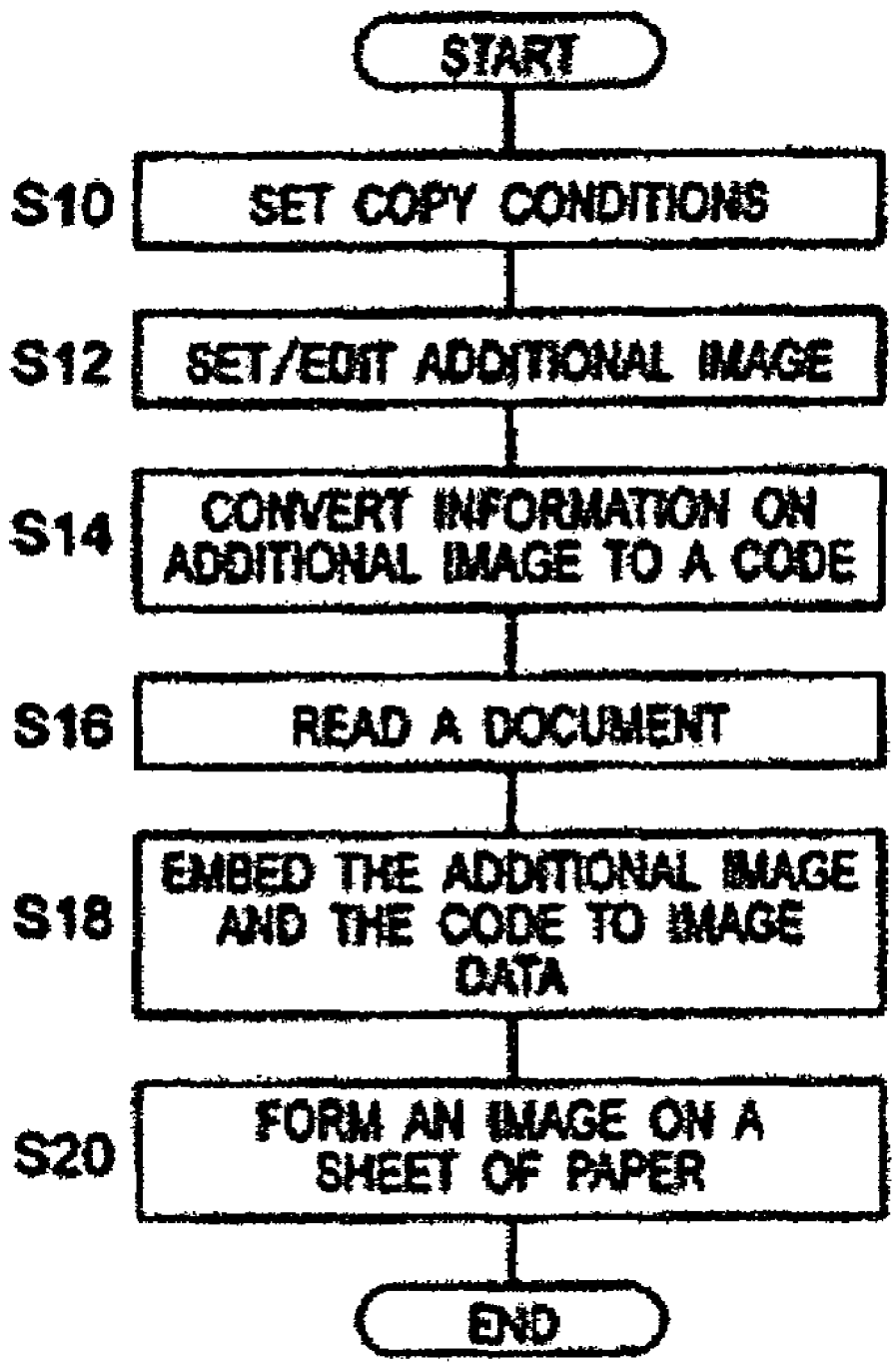
FIG. 3 is a flowchart of embedding a ground pattern.

In the multifunctional peripheral, a document with a ground pattern added to an image of an original can be printed. FIG. 3 is a flowchart of embedding a ground pattern.

First, copy conditions set by an operator with the operation panel 14 are received (S10). When a ground pattern is added to the image of an original, information on the additional image (for example, information on the characters and arrangement such as character string data of the hidden characters, font size, repeat distance and color of the characters) set and edited by the operator is received (S12). Then, the information on the additional image is converted to a code (S14). When a start button is pressed in the operation panel 14, a document of the original is read by the scanner 16 (S16). Then, the additional image and the code are embedded in the read image data (S18), and an image is formed on a sheet of paper by the print head 22 (S20). The processings at steps S12, S14 and S18 correspond to the setting editor 28, the code converter 30 and the code embedder 32 shown in FIG. 2. Known processings may be used at steps S12, S14 and S18, and detailed explanation is omitted here. When the printed material produced above including the ground pattern is copied further, if the magnifying power is one, the embedded code is not extracted from the image, and conventional ground pattern processing is performed or the hidden characters are visualized. In this case, the additional image is formed as intended by the operator by visualizing the hidden characters, and the effect of suppressing illegal copying is derived. Therefore, it is not needed to extract the embedded code. Further, various processing such as code extraction, ground pattern deletion, stamp image creation and synthesis of stamp image are also not necessary, so that productivity of copies as well as image quality can be maintained.

Figure 4:
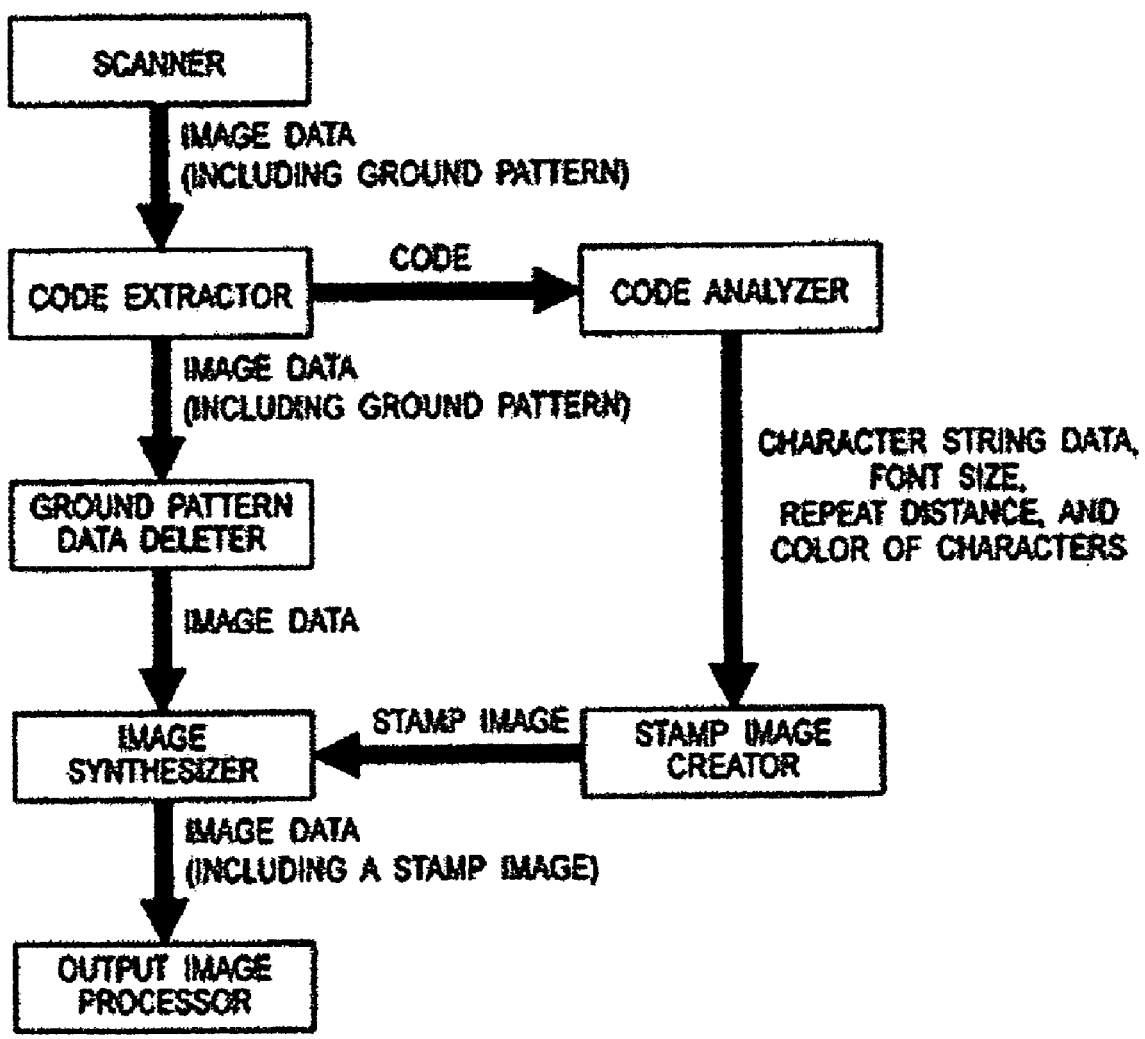
FIG. 4 is a diagram for explaining control on the ground pattern.

Next, the processing of the system controller 10 in the reduction copy, N-in-1 copy and enlargement copy for image data is explained. FIG. 4 shows this processing. The system controller 10 receives image data of a document image including a background pattern which has been read by the scanner 16 and processed by the input image processor 18. When it is decided that the meaning of the additional image becomes unclear by the image processing, the code is extracted from the image data. Next, the ground pattern data is deleted from the image data to obtain image data of the original. On the other hand, by analyzing the extracted code, the stamp information such as information on the characters and arrangement such as character string data of the hidden characters, font size, repeat distance and color of the characters included in the code are obtained. Then, a stamp image is created based on the information of the code, and the original image data is overwritten with the stamp image. Then, the resultant synthesized image is sent to the output image processor 20, and it is formed on a sheet of paper. Thus, a stamp image is enforced to be added based on the detected code.

Next, the processing of the system controller 10 is explained when a copy of a document with a background pattern is enlarged or reduced. In any embodiment, the additional image has hidden characters, and a code on information of the pattern of the hidden characters, the stamp information and the like is synthesized beforehand with the ground pattern in a document image data.

Figure 5:
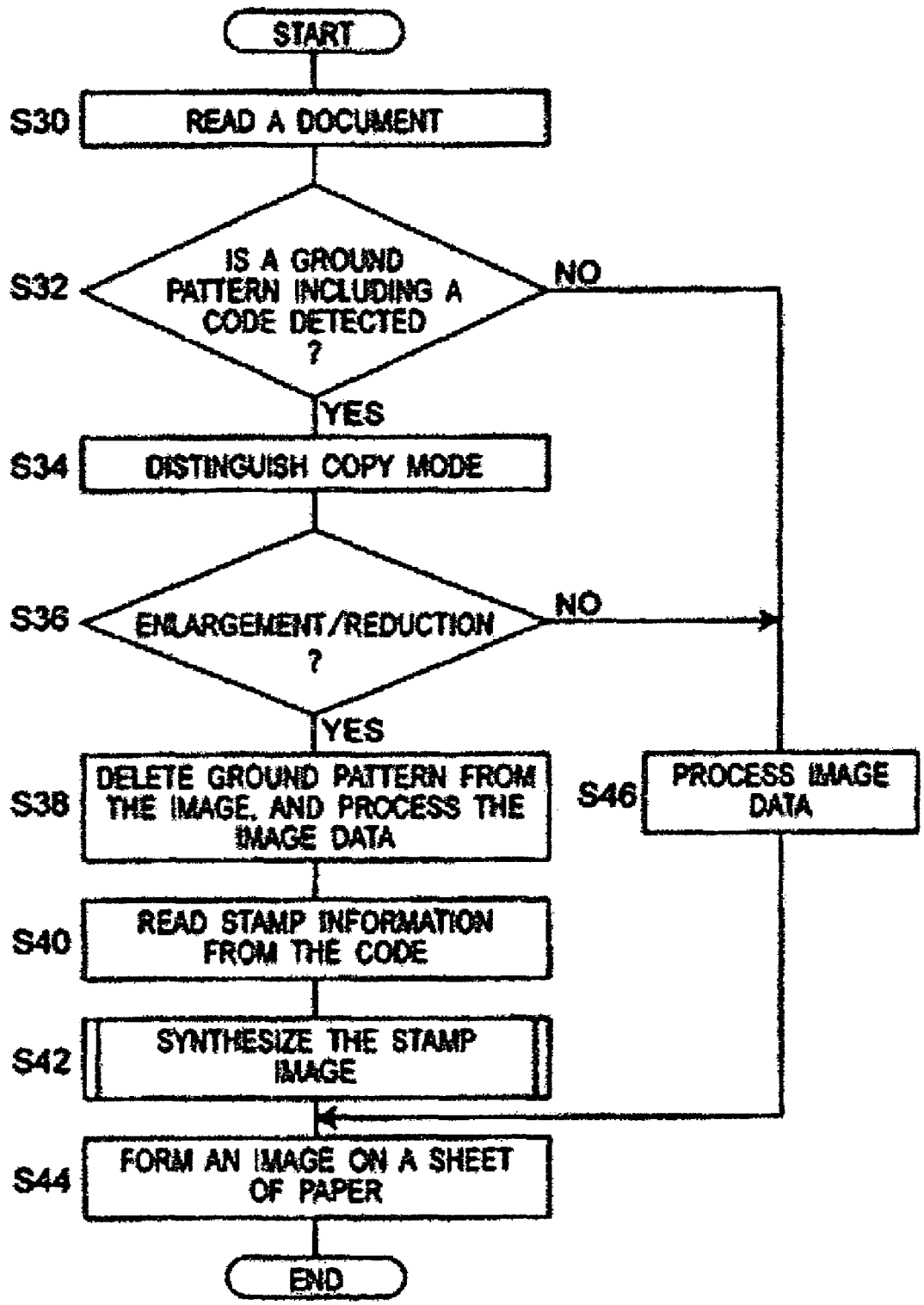
FIG. 5 is a flowchart of copying in a first embodiment of the invention.

In a first embodiment of the invention, a stamp image is synthesized with the image of a document when the document with a ground pattern is copied with enlargement or reduction. FIG. 5 shows a flowchart of this processing. First an operator sets a document on the scanner 16, sets a copy mode and presses a start button in the operational unit 14. Thus, image data read by the scanner 16 is received (S30). When the image data is analyzed and the embedded code is detected (YES at S32), or when it is decided that the ground pattern with the code is included, the current copy mode is verified (S34). When it is decided that the image data will be enlarged or reduced in the copy mode (YES at S36), the ground pattern is deleted from the image data because the meaning of the additional image may become unclear (S38), to obtain image data of the original. Then, the image data is enlarged or reduced according to the copy mode. Next, the stamp information is read from the detected code (S40), and the stamp image based on the stamp information overwrites the original image data (S42). Then, the obtained image data is sent to the output image processor 20 for forming the image on a sheet of paper (S44). On the other hand, when it is not decided that the ground pattern with the code is included (NO at S32), or when it is not decided that the image data will be enlarged or reduced (NO at S36), the image data is processed, if necessary, according to the copy mode (S36). Then, the flow proceeds to step S44 for forming the image on a sheet of paper.

Figure 6:
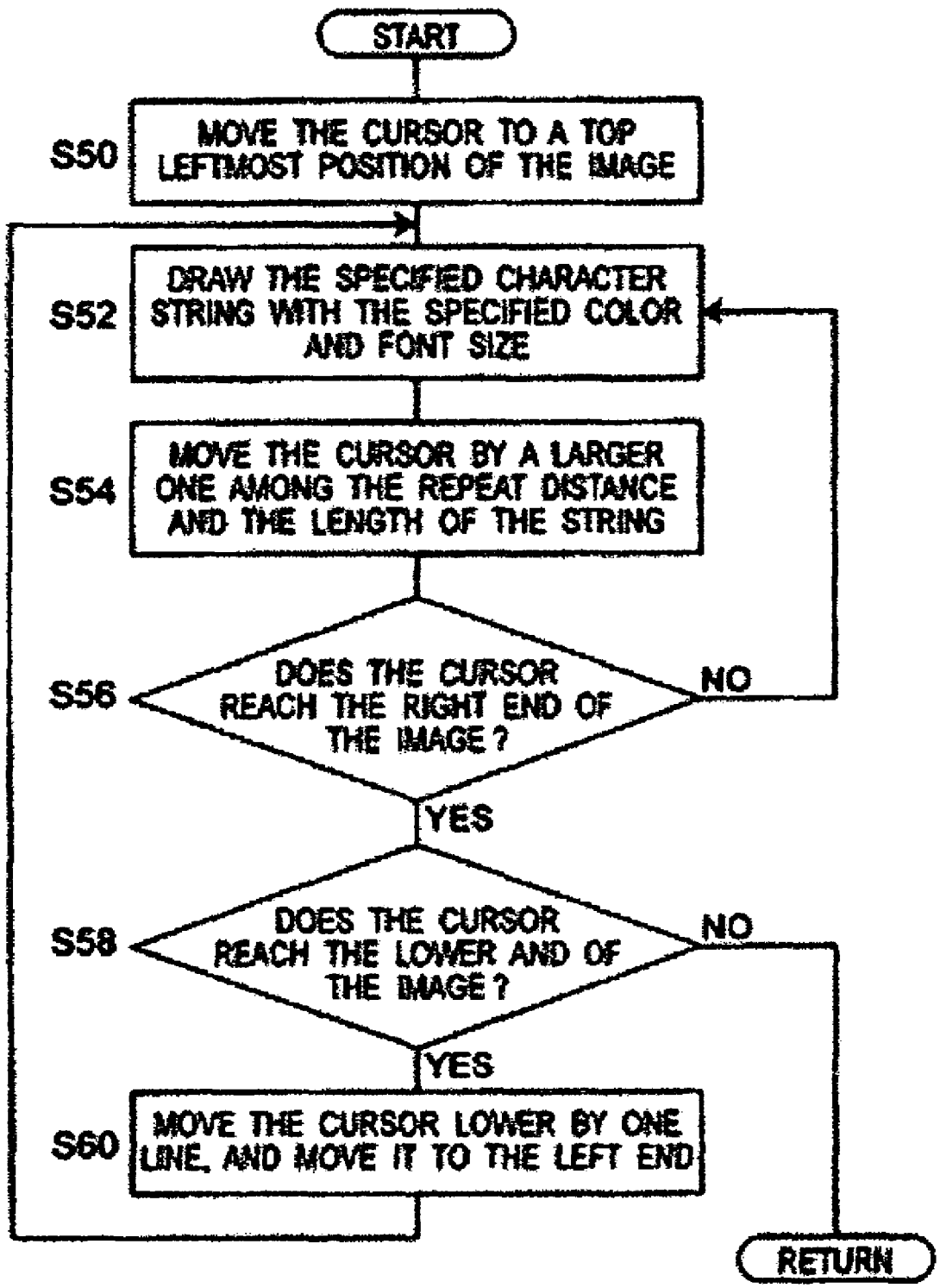
FIG. 6 is a flowchart of creation of a stamp image.

FIG. 6 is a flowchart of the synthesis of stamp image (S42 in FIG. 5). In the initialization, a cursor for drawing an image is moved to a top leftmost position of the image (S50). Next, a stamp image or a character string specified by the character string information is drawn with the specified color of the characters and with the specified font size (S52). That is, the original image is overwritten with the stamp image. Then, the cursor is moved by a larger one among the repeat distance and the length of the character string (S54). When it is decided that the cursor does not yet reach the right end of the image (NO at S56), the flow returns to step S52. On the other hand, when it is decided that the cursor reaches the right end of the image (YES at S56), it is also decided whether the cursor reaches the lower end of the image (S58). If the cursor does not yet reach the lower end of the image, the cursor is moved lower by one line and is returned to the left end of the image (S60). Then the flow returns to step S52. When the cursor has reached the lower end of the image, the processing is completed.

In a second embodiment of the invention, when a document including a ground pattern is copied, the arrangement of an additional image (hidden characters) is considered in the case of enlargement. Even for a enlargement copy, a normal output processing is performed if it is decided that the hidden characters do not run over a sheet of paper.

Figure 7:
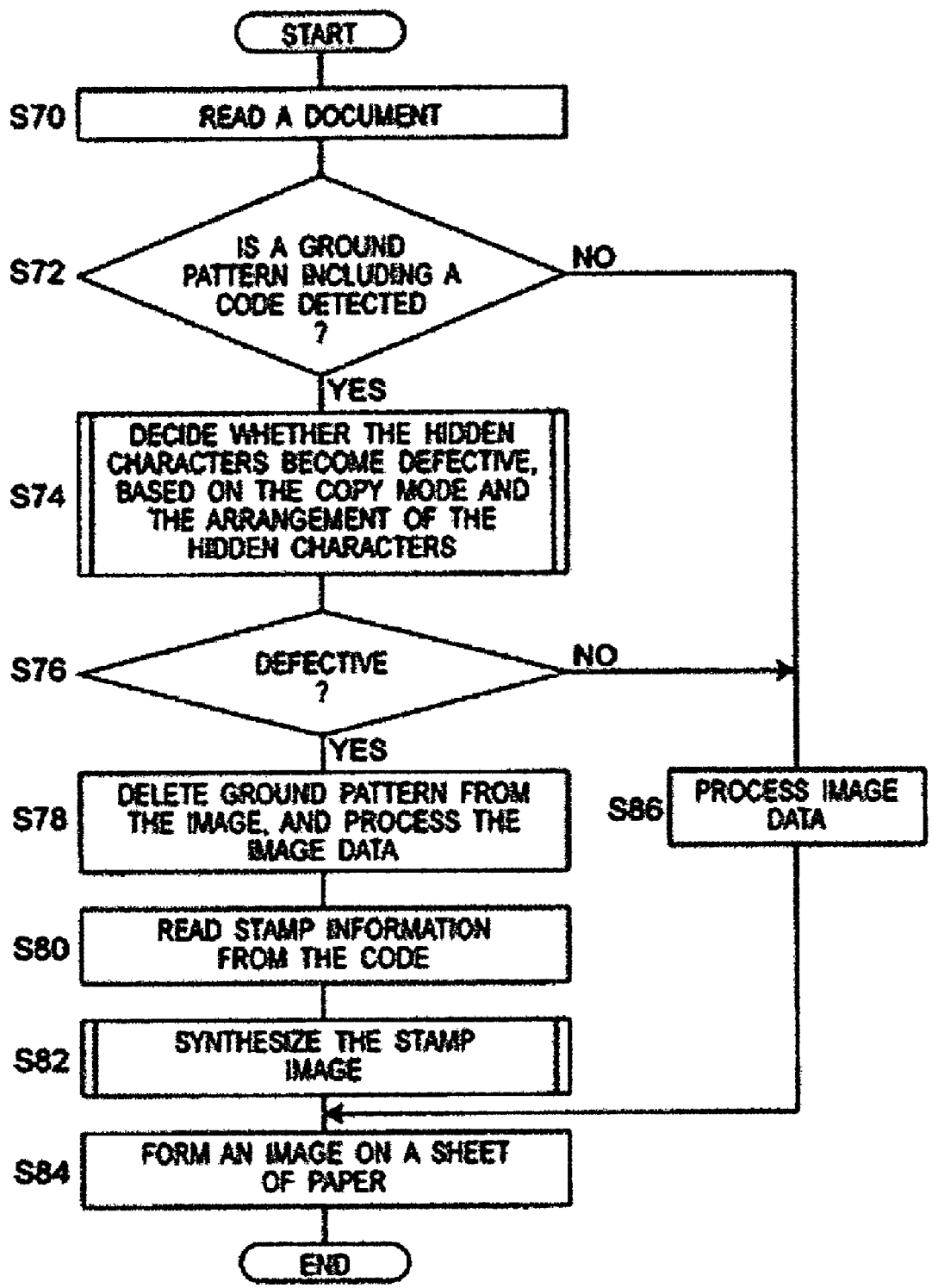
FIG. 7 is a flowchart of copying in a second embodiment of the invention.

FIG. 7 shows a flowchart of this processing in the second embodiment. First an operator sets a document on the scanner 16, sets a copy mode and presses a start button in the operational unit 14. Thus, image data read by the scanner 16 is received (S70). When the image data is analyzed and the embedded code is detected (YES at S72), or when it is decided that the ground pattern with the code is included in the image, it is decided whether the hidden characters become defective or not, based on the copy mode and the arrangement of the hidden characters derived from the code (S74, refer to FIG. 8). When it is decided that the hidden characters become defective (YES at S76), the ground pattern is deleted from the image data (S78), to obtain image data of the original. Then, the original image data is processed according to the copy mode. Next, the stamp information is read from the detected code (S80), and the original image data is overwritten with the stamp image based on the stamp information (S82, refer to FIG. 6). Then, the obtained image data is sent to the output image processor 20 for forming the image on a sheet of paper (S84). On the other hand, when it is decided that the ground pattern with the code is not included (NO at S72), or when it is decided that the hidden characters do not become defective (NO at S76), the image data is processed according to the copy mode if necessary (S86). Then, the flow proceeds to step S84 for forming the image on a sheet of paper.

Figure 8:
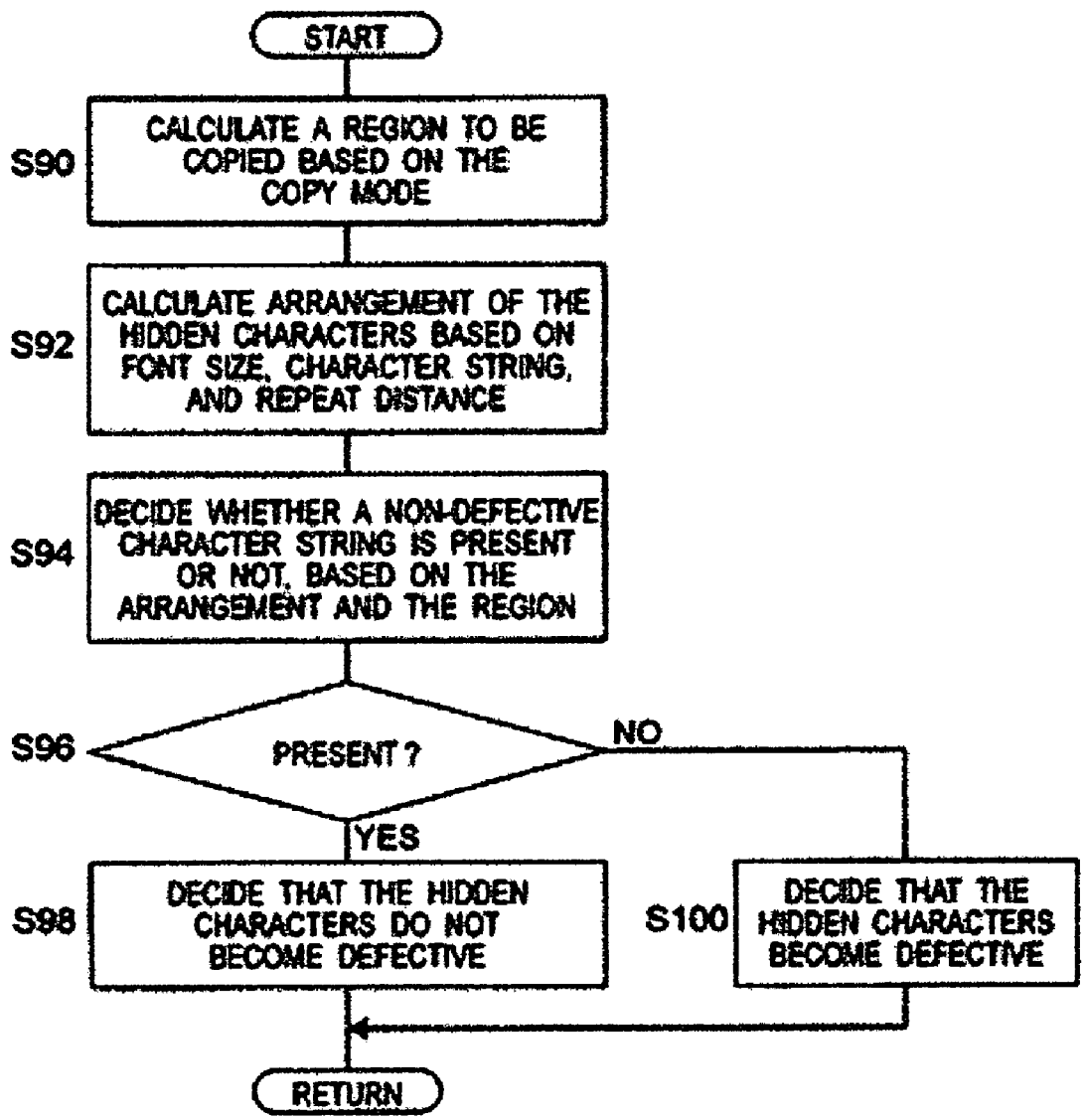
FIG. 8 is a flowchart of decision whether the hidden characters are defective or not.

FIG. 8 is a flowchart on the decision whether the hidden characters become defective or not (S74 in FIG. 7). First, a region in the original document to be copied on a sheet of paper is calculated based on the copy mode (S90), and the arrangement of the hidden characters are calculated based on the font size, character string and repeat distance of the hidden characters (S92). Then it is decided whether a non-defective character string is present or not, based on the arrangement of the hidden characters and the region to be copies (S94). If a non-defective character string is present (YES at S96), it is decided that the hidden characters are not defective (S98, otherwise it is decided that the hidden characters are defective (S100).

When an image is reduced (reduction copy or N-in-1 copy modes), it is liable to become difficult to reproduce the hidden characters. In a third embodiment of the invention, when a document including a ground pattern is copied with reduction of the image, a normal output processing is performed when it is decided that the hidden characters are reproduced based on the dot arrangement of the background and the hidden characters. On the other hand, when it is decided that they are not reproduced, the above-mentioned stamp processing is performed.

Figure 9:
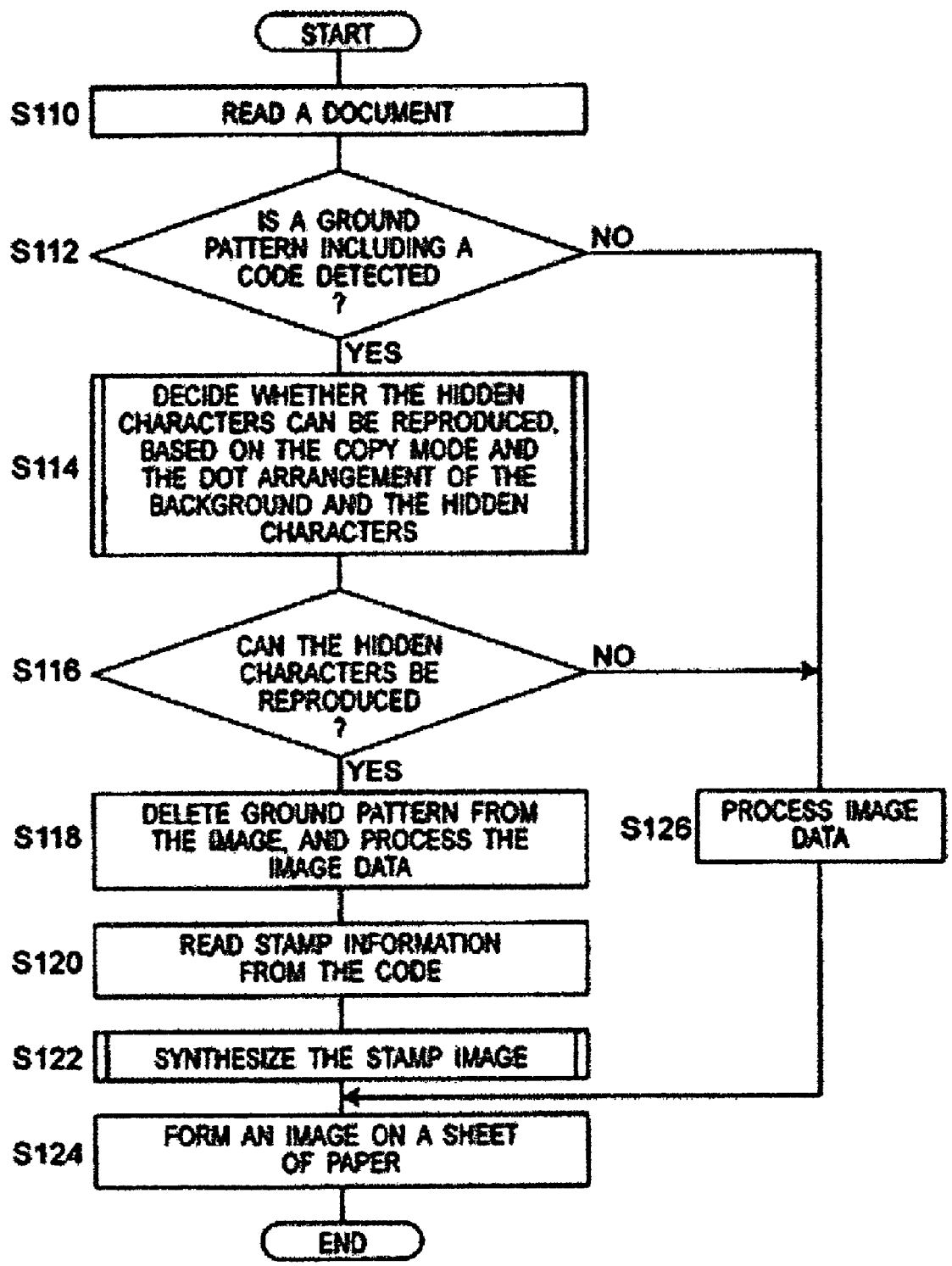
FIG. 9 is a flowchart of copying in a third embodiment of the invention.

FIG. 9 is a flowchart of this processing in the third embodiment. First an operator sets a document on the scanner 16, sets a copy mode and presses a start button in the operational unit 14. Thus, image data read by the scanner 16 is received (S110). When the image data is analyzed and the embedded code is detected (YES at S112), image data of an original is obtained, and the image data is processed according to the copy mode. The dot arrangement information on the dots of the background and the hidden characters are read from the code, and it is decided whether the hidden characters can be reproduced on a sheet of paper (S114, refer to FIG. 10). The dot arrangement information of the ground pattern and the hidden characters includes line numbers, screen angle and shape of dither pattern. When it is decided that a pattern of the hidden characters cannot be reproduced on a sheet of paper (NO at step S116), the ground pattern is deleted from the image data (S118), to obtain the image data of the original, and the image data is processed according to the copy mode. The stamp information is read from the code (S120, refer to FIG. 6), and the original image data is overwritten with the stamp image based on the stamp information (S122). Then, the obtained image data is sent to the output image processor 20 for forming the image on a sheet of paper (S124). On the other hand, when it is decided that the ground pattern with the code is not included (NO at S112), or when it is decided that the hidden characters cannot be reproduced (NO at S116), the image data is processed according to the copy mode if necessary (S126). Then, the flow proceeds to step S124 for forming the image on a sheet of paper.

Figure 10:
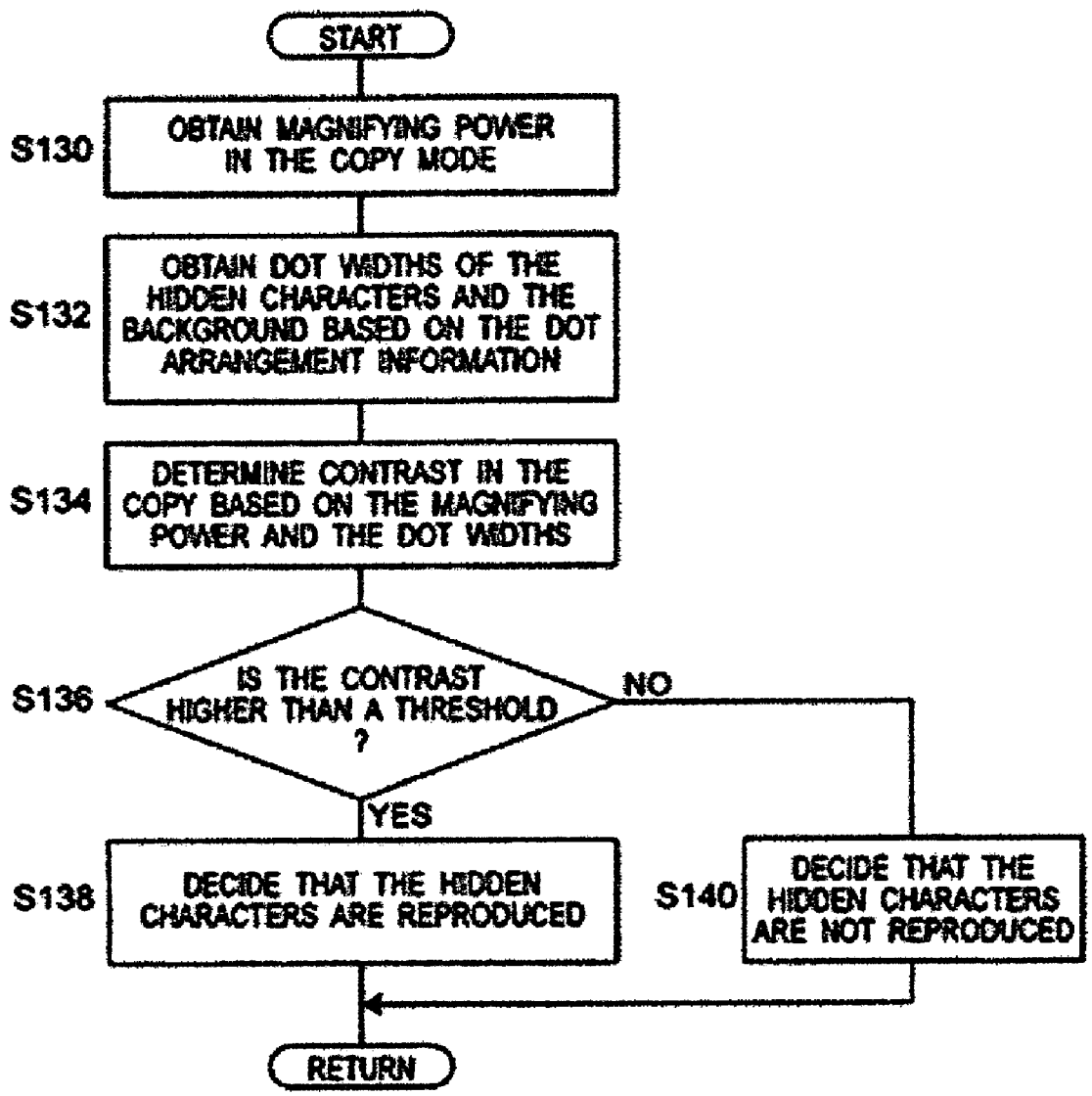
FIG. 10 is a flowchart of judgment whether the hidden characters are reproduced or not.

FIG. 10 shows a flowchart of an example of the decision on the reproduction of the hidden characters (S114 in FIG. 9). First, magnifying power in the current copy mode is obtained (S130). Next, dot widths of the hidden characters and of the background are obtained based on the dot arrangement information (S132), and contrast of the image in a copy is determined based on the magnifying power and the dot widths (S134). If the contrast is larger than a threshold value (YES at S136), it is decided that the hidden characters are reproduced (S138). Otherwise it is decided that the hidden characters are not reproduced (S140).

Figure 11:
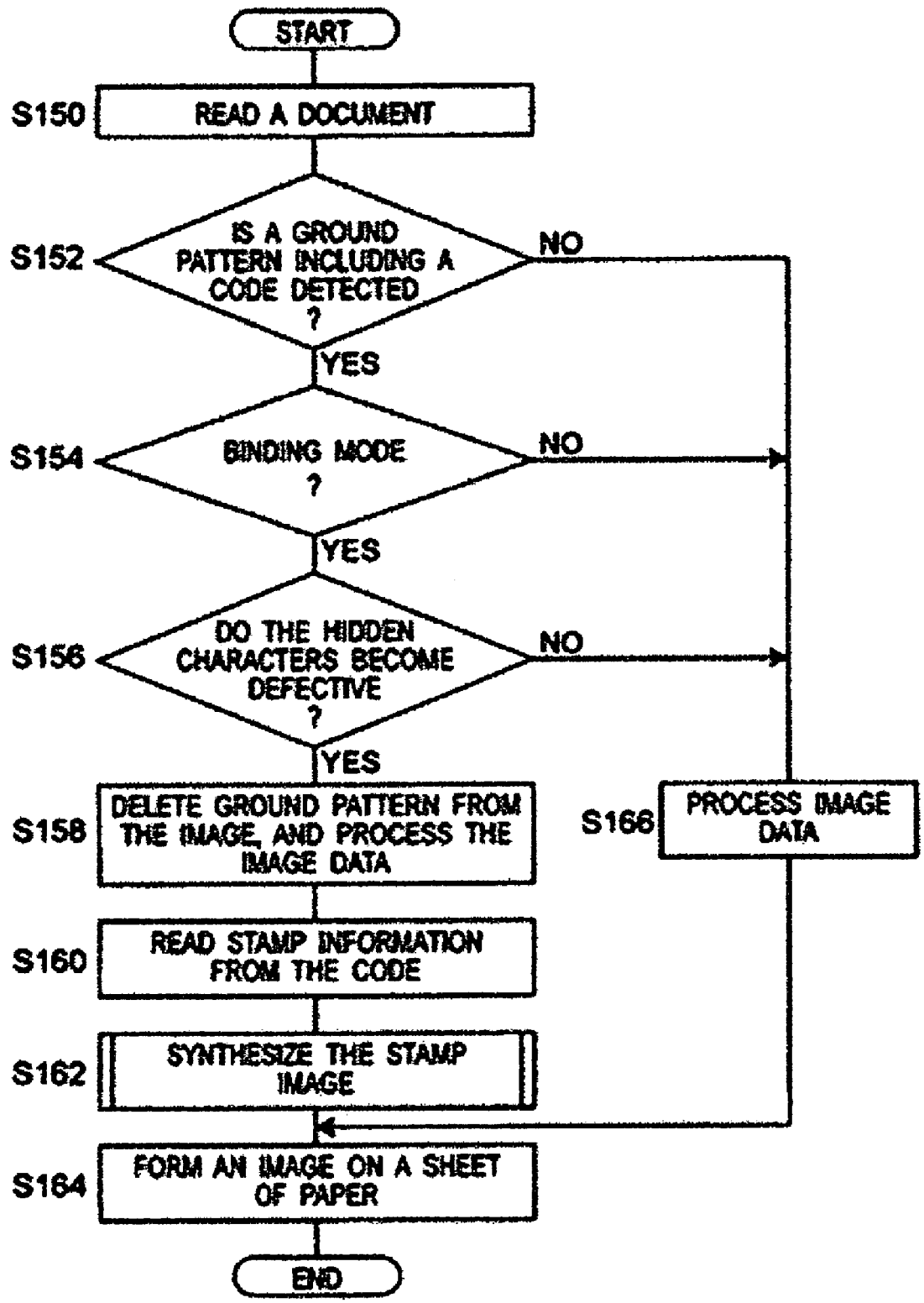
FIG. 11 is a flowchart of copying in a fourth embodiment of the invention.

In a fourth embodiment of the invention, a margin for binding is considered when a document with a ground pattern is copied in binding mode. When a margin for binding is formed on copying, the hidden characters have to be reproduced on a sheet of paper as intended. FIG. 11 shows a flowchart of this processing in the fourth embodiment. First an operator sets a document on the scanner 16, sets a copy mode and presses a start button in the operational unit 14. Thus, image data read by the scanner 16 is received (S150). When the image data is analyzed and the embedded code is detected (YES at S152), image data of an original is obtained, and the image data is processed according to the copy mode. Next, it is decided whether the current mode is binding mode for forming a margin for binding or not (S154), and in the binding mode it is decided whether the hidden characters become defective or not in the processing for binding (S156). When it is decided that the hidden characters become defective (YES at step S156), the ground pattern is deleted from the image data (S158), to obtain the image data of the original, and the image data is processed according to the copy mode. Next, the stamp information is read from the code (S160), and the original image data is overwritten with the stamp image based on the stamp information (S162, refer to FIG. 6). Then, the obtained image data is sent to the output image processor 20 for forming the image on a sheet of paper (S164). On the other hand, when it is not decided that the ground pattern with the code is included (NO at S152), or when it is not decided that the current mode is binding mode (NO at S156), the image data is processed according to the copy mode if necessary (S166). Then, the flow proceeds to step S164 for forming the image on a sheet of paper.

Figure 12:
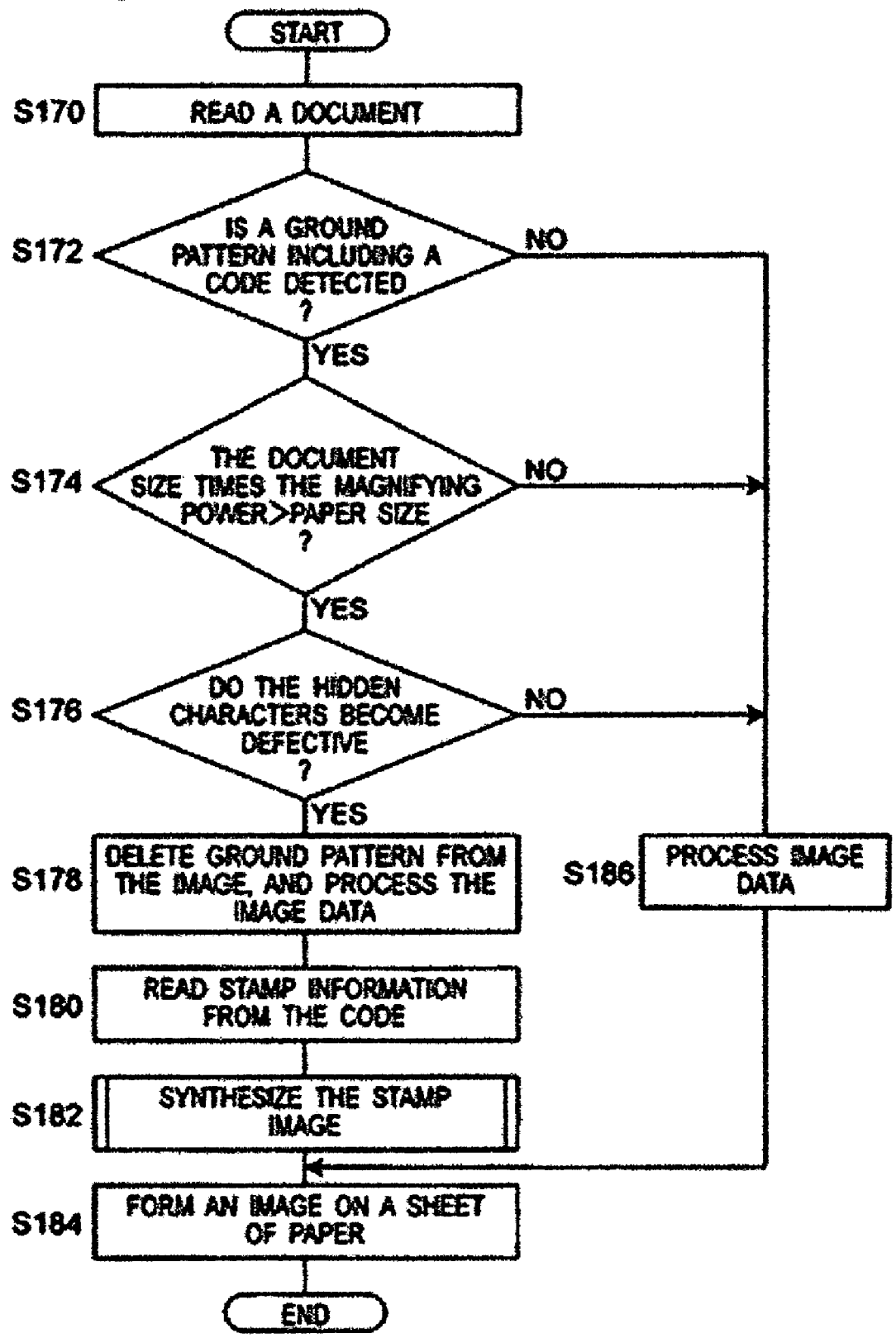
FIG. 12 is a flowchart of copying in a fifth embodiment of the invention.

In a fifth embodiment of the invention, when a document with a ground pattern is copied with enlargement of the image, if the image is decided to become defective based on the document size and the magnifying power, the hidden characters are reproduced as intended on a sheet of paper. FIG. 12 shows a flowchart of this processing in the fifth embodiment. First an operator sets a document on the scanner 16, sets a copy mode and presses a start button in the operational unit 14. Thus, image data read by the scanner 16 is received (S170). When the image data is analyzed and the embedded code are detected (YES at S172), to obtain image data of an original, and the image data is processed according to the copy mode. Next, it is decided whether the document size times the magnifying power is larger than the size of the copy paper (S174). If the document size times the magnifying power is larger than the size of the copy paper, it is decided next whether the hidden characters become defective or not (S176). When it is decided that the hidden characters become defective (YES at step S176), the ground pattern is deleted from the image data (S178), to obtain the image data of the original, and the image data is processed according to the copy mode. Next, the stamp information is read from the code (S180, refer to FIG. 6), and the original image data is overwritten with the stamp image based on the stamp information (S182). Then, the obtained image data is sent to the output image processor 20 for forming the image on a sheet of paper (S184). On the other hand, when it is not decided that the ground pattern with the code is included (NO at S172), or when it is decided that the document size times the magnifying power is not larger than the size of the copy paper (NO at S176), the image data is processed according to the copy mode if necessary (S186). Then, the flow proceeds to step S184 for forming the image on a sheet of paper.

Figure 13:
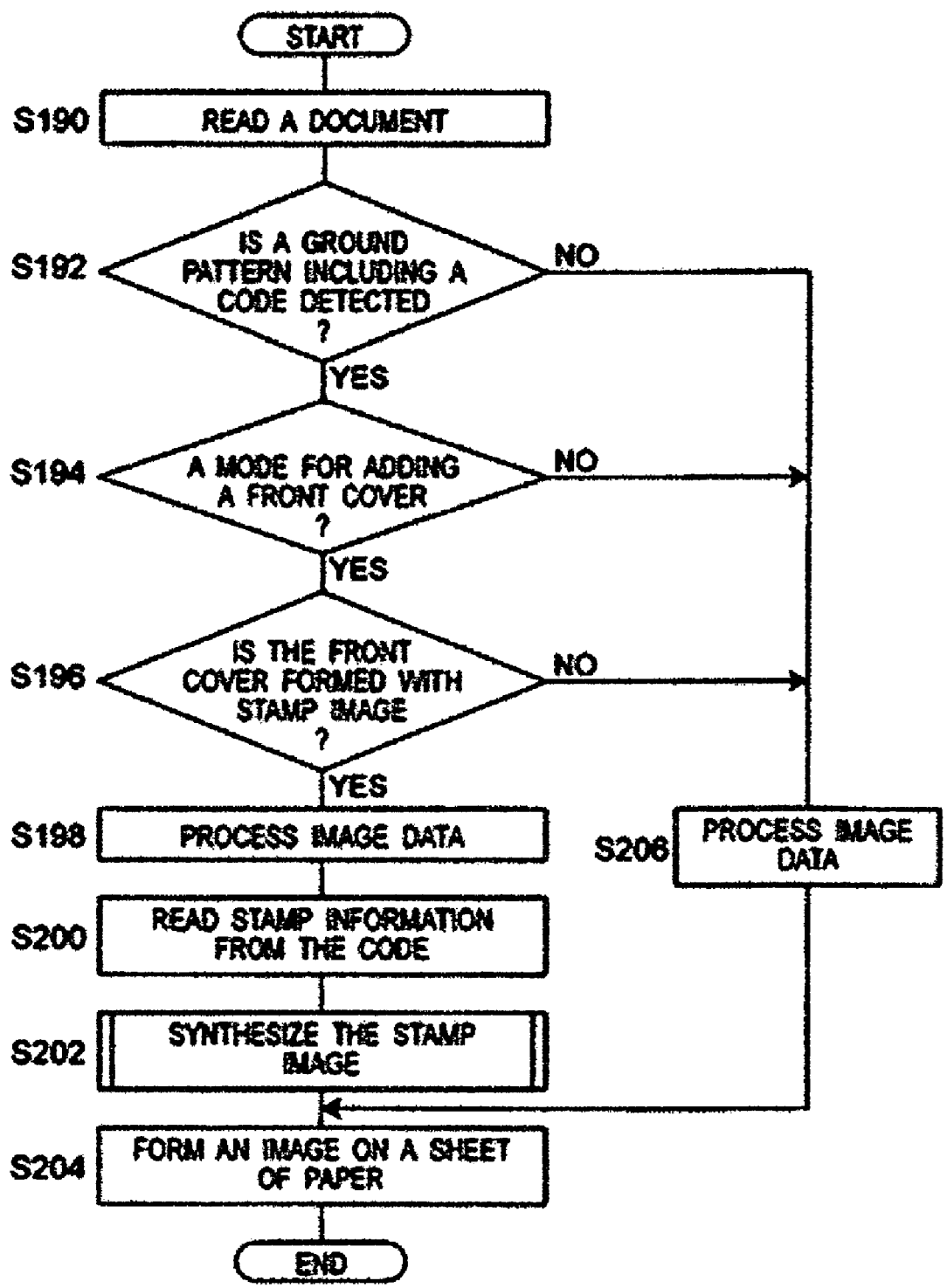
FIG. 13 is a flowchart of copying in a sixth embodiment of the invention.

In a sixth embodiment of the invention, when a document with a ground pattern is copied, a mode for adding a front cover is considered. When a front cover is added, a document with visualized hidden characters cannot be observed because it is not exposed by the front cover. Then, a stamp image is also printed on the front cover. FIG. 13 shows a flowchart of this processing in the sixth embodiment. First an operator sets a document on the scanner 16, sets a copy mode and presses a start button in the operational unit 14. Thus, image data read by the scanner 16 is received (S190). When the image data is analyzed and the embedded code is detected in the image data (YES at S192), image data of an original is obtained, and it is processed according to the copy mode. Next, it is decided whether the current mode is the mode for adding a front cover (S194). In the mode for adding a front cover, it is decided next whether or not a front cover is formed by adding the stamp image (S196). If the front cover is formed with the stamp image (YES at S196), the image data is processed according to the copy mode if necessary (S198). Then the stamp information is read from the code (S200), and the image data of the front cover is overwritten with the stamp image based on the stamp information (S202, refer to FIG. 6). Then, the obtained image data is sent to the output image processor 20 for forming the image on a sheet of paper (S204). On the other hand, when it is not decided that the ground pattern with the code is included (NO at S192), or when it is not decided that the mode is the mode for adding a front cover (NO at S194), or when the front cover is not formed with copying the hidden characters (NO at S196), the image data is processed according to the copy mode if necessary (S206), and the flow proceeds to step S204 for forming the image on a sheet of paper.

Figure 14:
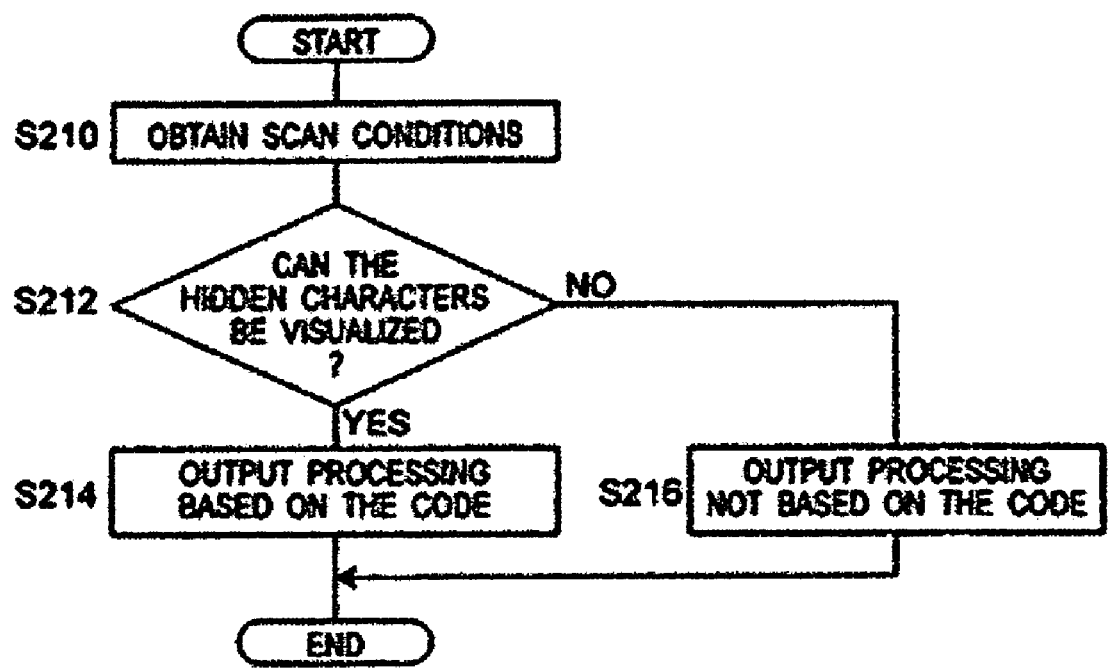
FIG. 14 is a flowchart of copying in a seventh embodiment of the invention.

In a seventh embodiment of the invention, an operator sets scan conditions for the scanner 16 with the operating unit 14. The visualization of hidden characters depends on the scan conditions. FIG. 14 shows a flowchart of this processing in the seventh embodiment. After an image is read by the scanner 16, when the image is formed, the scan conditions are obtained (S210). When it is decided that hidden characters are not visualized or are hard to be visualized according to the scan conditions (YES at step S212), the output processing is performed based on a code detected in the image data (S214). Otherwise, the output processing is performed not based on the code (S216). The output processing based on the code is, for example, synthesis of a stamp image. In this case, when hidden characters are not be visualized or are hard to be visualized, the background and the additional image are deleted, and a stamp image is added. The output processing not based on the code is, for example, visualization of hidden characters without using the code.

In the above-mentioned embodiment, an image read by the scanner is formed on a sheet of paper. However, the invention is not limited to the image forming. An image read by the scanner can be provided as an image file in various ways. For example, it can be stored in a storage device or transmitted via a network as a file attached to an electronic mail.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming method, performed by an image forming apparatus, the method comprising:
   reading a printed material to provide an image data thereof, the printed material including an image of an original, an additional image and a code representing information, the additional image being not recognizable or difficult to recognize by the naked eye of an observer, the additional image being visualized when an image is formed based on the image data with the image forming apparatus;
   detecting the code of the printed material;
   determining if a part of the additional image, visualized when a reproduction of the image is produced, is defective or difficult to be recognized;
   synthesizing a stamp image with the image data based on the detected code if it is determined that a part of the additional image, visualized when a reproduction of the image is produced, is defective or difficult to be recognized in the reproduction of the printed material; and
   providing the image data synthesized with the stamp image.

2. The image forming method according to claim 1, wherein the code expresses information on the additional image, and the stamp image includes the additional image.

3. The image forming method according to claim 1, wherein the stamp image is synthesized when the image of the printed material is enlarged or reduced.

4. The image forming method according to claim 3, wherein even when the image is enlarged, the stamp image is not synthesized if it is decided that the additional image does not become defective when enlarged.

5. The image forming method according to claim 3, wherein the code includes information on a size of the additional image, and even when the image is enlarged, the stamp image is not synthesized if it is decided that the enlarged additional image does not become defective.

6. The image forming method according to claim 3, wherein the code includes information on an arrangement of dots of the additional information, and even when the image is reduced, the stamp image is not synthesized if it is decided based on the information on the arrangement of dots of the additional information that the enlarged additional image is visualized.

7. The image forming method according to claim 1, wherein when a binding mode is set for providing a margin for binding, and when it is decided that the additional image becomes defective due to the provided margin, said synthesizer provides the margin for the image data and synthesizes the stamp image with the image data.

8. The image forming method according to claim 1, wherein it is possible to set scan conditions, and the synthesis of the stamp image is performed if it is decided that the additional image is not visualized in the scan conditions.

9. The image forming method according to claim 1, wherein when the stamp image is synthesized, the additional image is deleted from the image data.

10. An image forming apparatus comprising:
    a scanner which reads an image data of a printed material, wherein the printed material includes an image of an original, an additional image and a code which represents information, the additional image being not recognizable or difficult to recognize by the naked eye of an observer, the additional image being visualized when the printed material is reproduced with the image forming apparatus;
    a detector which detects the code;
    a synthesizer which synthesizes a stamp image with the image data based on the code detected in the image data if it is determined that a part of additional image, visualized when a reproduction of the image is produced, is defective or difficult to be recognized in the reproduction of the printed material; and
    a printer which forms an image data synthesized with the stamp image.

11. The image forming apparatus according to claim 10, wherein the code expresses information on the additional image, and the stamp image includes the additional image.

12. The image forming apparatus according to claim 10, wherein said synthesizer synthesizes the stamp image when the image of the printed material is enlarged or reduced.

13. The image forming apparatus according to claim 12, wherein said synthesizer does not synthesize the stamp image if it is decided that the additional image does not become defective when enlarged even when the image is enlarged.

14. The image forming apparatus according to claim 12, wherein the code includes information on a size of the additional image, and even when the image is enlarged, the stamp image is not synthesized if it is decided that the enlarged additional image does not become defective.

15. The image forming apparatus according to claim 12, wherein the code includes information on an arrangement of dots of the additional information, and even when the image is reduced, the stamp image is not synthesized if it is decided based on the information on the arrangement of dots of the additional information that the enlarged additional image is visualized.

16. The image forming apparatus according to claim 10, wherein when a binding mode is set for providing a margin for binding, and when it is decided that the additional image becomes defective due to the provided margin, said synthesizer provides the margin for the image data and synthesizes the stamp image with the image data.

17. The image forming apparatus according to claim 10, wherein when a mode for adding a front cover is set, said synthesizer synthesize the stamp image with an image of the front cover.

18. The image forming apparatus according to claim 10, wherein it is possible to set scan conditions, and the synthesis of the stamp image is performed if it is decided that the additional image is not visualized in the scan conditions.

19. The image forming apparatus according to claim 10, wherein when the stamp image is synthesized, the additional image is deleted from the image data.

20. A computer readable medium storing computer program instructions which when executed by an image forming apparatus, including a computer programmed with the instructions, causes the image forming apparatus to perform the steps of:

reading an image data of a printed material, wherein the printed material includes an image of an original, an additional image and a code which represents information, the additional image being not recognizable or difficult to recognize by the naked eye of an observer, the additional image being visualized when the printed material is reproduced with the image forming apparatus;

detecting the code, determining if a part of the additional image, visualized when a reproduction of the image is produced, is defective or difficult to be recognized;

synthesizing a stamp image with the image data based on the code detected in the image data if it is determined that a part of the additional image, visualized when a reproduction of the image is produced, is defective or difficult to be recognized in the reproduction of the printed material; and providing an image data synthesized with the stamp image.

\* \* \* \* \*

UNITED STATES PATENT AND TRADEMARK OFFICE
CERTIFICATE OF CORRECTION

| | | |
|---|---|---|
| PATENT NO. | : 7,692,811 B2 | Page 1 of 1 |
| APPLICATION NO. | : 11/162718 | |
| DATED | : April 6, 2010 | |
| INVENTOR(S) | : Yoshiyuki Tamai et al. | |

It is certified that error appears in the above-identified patent and that said Letters Patent is hereby corrected as shown below:

On the Title Page, item [56]:
On page 2, under Foreign Patent Documents, please delete "JP 1 014 318 B1 5/2004" and add
--EP 1 014 318 B1 5/2004--.

Signed and Sealed this
Twenty-eighth Day of December, 2010

David J. Kappos
*Director of the United States Patent and Trademark Office*